US008458298B2

(12) United States Patent
Josefsberg et al.

(10) Patent No.: US 8,458,298 B2
(45) Date of Patent: Jun. 4, 2013

(54) FAILOVER IN AN INTERNET LOCATION COORDINATE ENHANCED DOMAIN NAME SYSTEM

(75) Inventors: Arne Josefsberg, Medina, WA (US);
John D Dunagan, Bellevue, WA (US);
Mark D. Scheibel, Kirkland, WA (US);
Alastair Wolman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 216 days.

(21) Appl. No.: 12/041,599

(22) Filed: Mar. 3, 2008

(65) Prior Publication Data
US 2009/0222582 A1 Sep. 3, 2009

(51) Int. Cl.
*G06F 15/177* (2006.01)
*G06F 15/16* (2006.01)

(52) U.S. Cl.
USPC .......................................... 709/220; 709/245

(58) Field of Classification Search
USPC .................. 709/220, 221, 223, 245
See application file for complete search history.

(56) References Cited

U.S. PATENT DOCUMENTS

| | | | |
|---|---|---|---|
| 6,128,279 A | 10/2000 | O'Neil et al. | |
| 6,351,775 B1 | 2/2002 | Yu | |
| 6,446,121 B1* | 9/2002 | Shah et al. | 709/224 |
| 6,606,643 B1* | 8/2003 | Emens et al. | 709/203 |
| 6,625,319 B1* | 9/2003 | Krishnamachari | 382/238 |
| 6,724,733 B1 | 4/2004 | Schuba et al. | |
| 6,785,704 B1 | 8/2004 | McCanne | |
| 6,981,055 B1 | 12/2005 | Ahuja et al. | |
| 7,003,555 B1 | 2/2006 | Jungck | |
| 7,062,562 B1 | 6/2006 | Baker et al. | |
| 7,111,061 B2 | 9/2006 | Leighton et al. | |
| 7,136,932 B1 | 11/2006 | Schneider | |
| 7,152,118 B2 | 12/2006 | Anderson, IV et al. | |
| 7,171,415 B2 | 1/2007 | Kan et al. | |
| 7,194,552 B1 | 3/2007 | Schneider | |
| 7,228,359 B1 | 6/2007 | Monteiro | |
| 7,284,051 B1 | 10/2007 | Okano et al. | |
| 7,519,690 B1* | 4/2009 | Barrow et al. | 709/220 |
| 7,574,508 B1 | 8/2009 | Kommula | |
| 7,584,301 B1 | 9/2009 | Joshi | |
| 7,685,422 B2* | 3/2010 | Isozaki et al. | 713/171 |
| 7,707,314 B2 | 4/2010 | McCarthy et al. | |

(Continued)

OTHER PUBLICATIONS

Wikipedia, Operating System.*

(Continued)

*Primary Examiner* — Jeong S Park
(74) *Attorney, Agent, or Firm* — Lee & Hayes, PLLC (57) ABSTRACT

An exemplary failover module includes (a) instructions to respond to a connection problem to a host server at an IP address by selecting a different IP address from a cached list of IP addresses for a domain name associated with the host server and (b) instructions to return the selected, different IP address to future name queries where the instructions to respond, the instructions to initiate, and the instructions to return execute at an operating system level of a computing device configurable to connect to at least one of a plurality of host servers. Such a module may include instructions to optionally initiate a connection to a host server at the selected, different IP address. An exemplary failover module may optionally select an IP address based in part on Internet Location Coordinates (ILCs) where the host servers reside in an ILC enhanced Domain Name System (DNS). Other methods, devices and systems are also disclosed.

19 Claims, 7 Drawing Sheets

U.S. PATENT DOCUMENTS

| | | | |
|---|---|---|---|
| 7,710,984 B2 | 5/2010 | Dunk | |
| 7,991,879 B2* | 8/2011 | Josefsberg et al. | 709/224 |
| 2002/0038360 A1 | 3/2002 | Andrews et al. | |
| 2003/0053424 A1 | 3/2003 | Krishnamurthy et al. | |
| 2003/0069968 A1 | 4/2003 | O'Neil et al. | |
| 2003/0139898 A1* | 7/2003 | Miller et al. | 702/178 |
| 2003/0229697 A1 | 12/2003 | Borella | |
| 2004/0039798 A1 | 2/2004 | Hotz et al. | |
| 2004/0073640 A1 | 4/2004 | Martin et al. | |
| 2004/0264465 A1 | 12/2004 | Dunk | |
| 2005/0198286 A1* | 9/2005 | Xu et al. | 709/225 |
| 2005/0265317 A1 | 12/2005 | Reeves et al. | |
| 2006/0075139 A1* | 4/2006 | Jungck | 709/245 |
| 2006/0129675 A1 | 6/2006 | Zimmer et al. | |
| 2006/0143442 A1 | 6/2006 | Smith | |
| 2006/0190602 A1 | 8/2006 | Canali et al. | |
| 2006/0200539 A1 | 9/2006 | Kappler et al. | |
| 2006/0224773 A1 | 10/2006 | Degenaro et al. | |
| 2007/0016663 A1* | 1/2007 | Weis | 709/223 |
| 2007/0041393 A1 | 2/2007 | Westhead et al. | |
| 2007/0064715 A1 | 3/2007 | Lloyd et al. | |
| 2007/0088974 A1* | 4/2007 | Chandwani et al. | 714/6 |
| 2007/0100776 A1 | 5/2007 | Shah et al. | |
| 2007/0118668 A1 | 5/2007 | McCarthy et al. | |
| 2008/0016233 A1 | 1/2008 | Schneider | |
| 2008/0086574 A1 | 4/2008 | Raciborski et al. | |
| 2008/0235383 A1 | 9/2008 | Schneider | |
| 2009/0019181 A1 | 1/2009 | Fang et al. | |
| 2010/0010991 A1 | 1/2010 | Joshi | |

OTHER PUBLICATIONS

Operating System, Wikipedia, searched on Oct. 2010.*

Operating System searched from Wikipedia on Oct. 8, 2010.*

"Flow Control Platform (FCP) Solutions", at <<http://k2colocation.com/network-services/fcp.cfm>>, K2 Colocation, 2005, pp. 2.

Domain Name System (DNS), retrieved on Apr. 29, 2008 at <<http://www.unix.org.ua/orelly/networking/firewall/ch08_10.htm, Unix, pp. 1-11.

Domain Name System (DNS) A Guide to TCP/IP, retrieved at <<http://web.syr.edu/~djmolta/ist452/ch_07.ppt>>, Thomson Learning Course Technology, pp. 1-56.

Park, et al., CoDNS: Improving DNS Performance and Reliability via Cooperative Lookups, retrieved at <<http://www.cs.princeton.edu/nsg/papers/codns_osdi_04/paper.pdf>>, Princeton University, pp. 1-16.

Yegulalp, Change the Windows 2000 DNS cache, retrieved on Apr. 29, 2008 at <<http://searchwincomputing.techtarget.com/tip/0,289483,sid68_gci1039955,00.html>>, SearchWinComputing.com, pp. 1-3.

Wikipedia, "Operating System", retrived from <<http://en.wikipedia.org/wiki/Operating_system>> on Oct. 8, 2010, pp. #1-pp. #17.

Office action for U.S. Appl. No. 13/188,013, mailed on Nov. 15, 2011, Josefsberg et al., "Internet Location Coordinate Enhanced Domain Name System", 14 pages.

"Global Server Load Balancing for Disaster Recovery, Business Continuity, Performance Optimization and Datacenter Management ", at <<http://www.zeus.com/documents/en/ZXT/ZXTM_Global_Load_Balancer.pdf>>, Zeus Technology Limited, 1995-2007, pp. 4.

Linden, "The End of Federated Search?", at <<http://glinden.blogspot.com/2007/03/end-of-federated-search.html>>, Mar. 24, 2007, pp. 9.

* cited by examiner

EXEMPLARY API FUNCTIONS 660

ENABLE FAILOVER
662

STATEFUL INFO
664

NOTIFICATION
666

TIME-TO-LIVE (TTL) INFO
668

FAILOVER WITHOUT ILC
670

PERFORMANCE
672

FAILOVER IN AN INTERNET LOCATION COORDINATE ENHANCED DOMAIN NAME SYSTEM

BACKGROUND

Many applications require connection to remote resources on the Internet. For example, an email application typically requires connection to an email host server. Consider the HOTMAIL® email service that can be accessed using a client email application that connects to a host of the domain name www.hotmail.com. The client email application must resolve the domain name to a specific IP address for a HOTMAIL® email service host server. In this example, multiple host servers exist and the domain name resolution process returns a list of IP addresses for the multiple host servers. Upon receipt of the list in the local DNS resolver, the client email application will typically select the first IP address in the list and attempts to connect to the host server at this IP address. However, if the connection fails or cannot be made, the client email application may or may not incorporate logic to use other IP addresses returned by the DNS, and to attempt to connect to one of the other IP addresses. If the client email application does not incorporate this logic, then the client email application receives an error message and it cannot connect until the resource is available, or the DNS entry for the domain name times out and a different address is acquired. This mechanism can diminish a user's experience of the email system and needlessly waste Internet resources (e.g., by making repeated requests to an unavailable IP address when a suitable alternative IP address is available). Additionally, even if the client email application does incorporate logic to try multiple IP addresses, the knowledge that the first IP address was unavailable is not made available to other applications. Accordingly, other applications will naturally attempt to use the same unavailable IP address in attempting to connect to the same hostname, further diminishing the user's experience and needlessly wasting Internet resources.

Various exemplary methods, devices, systems, etc., described herein provide for client-side failover and, specifically, failover that can enhance user experience.

SUMMARY

An exemplary failover module includes (a) instructions to respond to a connection problem to a host server at an IP address by selecting a different IP address from a cached list of IP addresses for a domain name associated with the host server and (b) instructions to return the selected, different IP address to future name queries where the instructions to respond, the instructions to initiate, and the instructions to return execute at an operating system level of a computing device configurable to connect to at least one of a plurality of host servers. Such a module may include instructions to optionally initiate a connection to a host server at the selected, different IP address. An exemplary failover module may optionally select an IP address based in part on Internet Location Coordinates (ILCs) where the host servers reside in an ILC enhanced Domain Name System (DNS). Other methods, devices and systems are also disclosed.

DESCRIPTION OF DRAWINGS

Non-limiting and non-exhaustive examples are described with reference to the following figures.

2

DETAILED DESCRIPTION

Various exemplary methods, devices, system, etc., described herein pertain to client-side failover mechanisms in a Domain Name System (DNS). An exemplary client failover module can be configured to failover client applications in a seamless manner. Such a module can enhance user experience of a client application when a host server fails or is unavailable to the client. An exemplary method can improve failover time by sharing knowledge across applications (e.g., where a failure that occurs for a connection associated with a first application can failover a connection associated with one or more other applications).

An exemplary client failover module optionally fails over a client application to a new host server according to a list cached in client memory. Such a failover mechanism can alleviate the need to implement logic inside the client application for utilizing all the IP addresses for a domain name, logic that some client applications currently fail to incorporate.

An exemplary client failover module can failover in a proactive manner, for example, by issuing a proactive DNS query when a certain number of IP addresses associated with a domain name appear to have connection problems. For example, if a module registers three IP address failures, where the IP addresses are associated with the same domain name, then the module may issue a new DNS query.

An exemplary client failover module optionally fails over a client application to a new host server based in part on Internet Location Coordinates (ILCs). Such a failover module operates in an ILC enhanced DNS system that includes beacons that help provide information to participants about their respective "locations" in a network space. A participant can be any resource on the network (e.g., a client, a server, etc.). In various examples, transmission of location information (e.g., ILCs) can occur via DNS and TXT records; via "Extensions to DNS" (EDNS) and explicit new record types; or entirely outside DNS but applied to select an address returned by a DNS query.

In various WINDOWS® operating systems, a client application can use an application programming interface (API) to resolve a domain name. For example, a client application can, for a specified domain name, call the API function gethostbyname( ), which causes a DNS client service to check a DNS resolver cache to see if the IP address is already known for the specified domain name. If the IP address for the domain name does not exist in the DNS resolver cache, then the Domain Name Resolver (DNR) component on the client computer sends a name query to a DNS server. The DNS server returns a list of IP addresses to the DNR component on the client, which is placed into the DNS resolver cache. Most applications then try to connect to the first IP address listed in the DNS resolver cache. For many applications, if the application cannot connect to the first IP address listed in the DNS resolver cache, then an error occurs (e.g., the application usually fails). Also, information in the DNS resolver cache may be stored in a file that can be used to preload the cache at boot (e.g., a HOSTS file).

Figure 1:
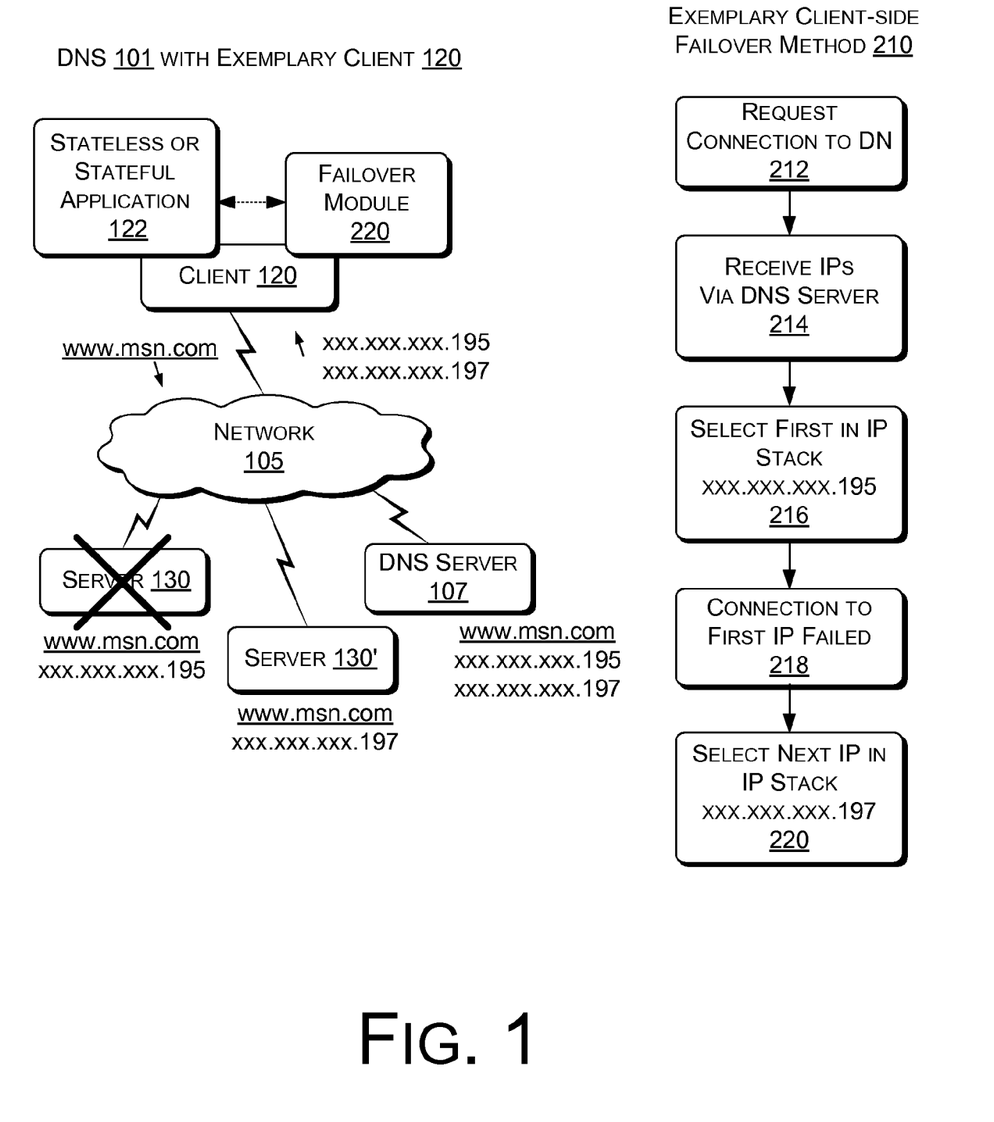
FIG. 1 is a diagram of an exemplary client and an exemplary client-side failover mechanism.

FIG. 1 shows a Domain Name System (DNS) 101 with an exemplary client 120 and an exemplary client-side failover method 210. The DNS 110 includes a network 105 (e.g., the Internet) and a DNS server 107. The client 120 includes a stateless or stateful application 122 and a failover module 220. In the example of FIG. 1, a domain name www.msn.com is geo-hosted (i.e., hosted by a plurality of servers in different geographical locations). Specifically, the domain name www.msn.com is hosted by a server 130 having an IP address xxx.xxx.xxx.195 and a server 130' having an IP address xxx.xxx.xxx.197.

According to the method 210, in a request block 212, the client application 122 requests a connection to a domain name (DN) (e.g., www.msn.com). The client 120, at the operating system level, includes a mechanism to resolve the domain name. In some instances, information may be cached at the client 120 such that an IP address can be readily obtained. However, where an IP address for the domain name is not cached, then the name resolution mechanism routes the request to another machine, such as the DNS server 107, which can associate the requested domain name with one or more IP addresses.

In a reception block 214, the client 120 receives IP addresses associated with the requested domain name. Such addresses are typically stored in a client-side resolver cache. The client 120 then selects the first IP address in the cache. In the example of FIG. 1, the address xxx.xxx.xxx.195 is the first IP address and is associated with the server 130 (i.e., a host of the www.msn.com domain name).

Upon selection of the first IP address, the client 120 attempts to establish a connection with the server 130. However, per a failure block 218, the connection fails. For example, the server 130 may be overloaded (timeout), down, or on a pathway that is faulty. In such a situation, the failover module 220 selects another (e.g., the next) IP address in the cache, which is the IP address xxx.xxx.xxx.197, which is associated with the server 130'.

The method 210 relies on the failover module 220 of the client 120. The failover module 220 can operate at an OS level in the client 120. The failover module 220 may operate with or without notifying the client application 122. The failover module 220 may operate in a seamless manner such that a user's experience of the client application 122 is uninterrupted (although possibly slightly delayed as failover occurs). As explained with respect to FIG. 2, the failover module 220 may also operate as, or in conjunction with, a service (see, e.g., the DNS service 258 of FIG. 2).

As indicated in FIG. 1 by a dashed arrow, the failover module 220 optionally notifies the client application 122 of a failover. For example, where the application 122 is a stateful application, it may require transmission of login information with a host server of a domain name (e.g., an email account associated with the domain name www.hotmail.com). In such an example, the specific email host server maintains "state" information such as login information or information generated at login. At failover, the newly selected host server does not have the information stored by the failed host server and hence may require login by the stateful application 122. The failover module 220 can allow the stateful application 122 to transmit login or other stateful information to the newly selected host server. Such a process may occur in a seamless manner whereby user experience is not interrupted.

Optionally, the failover module 220 provides a notification that may be displayed via an OS interface to notify a user of a failover. This choice may be controlled by a client application or by a user. A client application may also include a mechanism that records, displays, etc., a failover notification. For example, where the failover module 220 has an associated application programming interface (API), an application developer may program features into a client application to respond to information received by the failover module 220. An exemplary failover module API may allow a client application to enable or disable failover (see, e.g., exemplary API functions 660 of FIG. 6).

As described herein, an exemplary failover module includes instructions to respond to a connection problem to a host server at an IP address by selecting a different IP address from a cached list of IP addresses for a domain name associated with the host server, instructions to optionally initiate a connection to a host server at the selected, different IP address, and instructions to return the selected, different IP address to future name queries and instructions to initiate a connection to a host server at the selected, different IP address where the instructions to respond, instructions to return and the instructions to initiate execute at an operating system level of a computing device configurable to connect to at least one of a plurality of host servers (e.g., optionally a OS level service). By operating at the operating system level, the knowledge of the connection problem is shared between applications, In particular, if a connection problem to the host server occurs in the context of a first application, and the selected second IP address is returned in the context of a second application, the second application will not experience the delay due to failing to connect to the first IP address before attempting the second IP address. In such a module, the connection problem may be a connection failure, an unacceptable connection response time or some other type of connection problem. As mentioned, an application may be a stateless or stateful application. For a stateful application, a host server typically stores state information about the application executing on the client. A failover module may include instructions to communicate state information to a host server.

As described herein, an exemplary method for failover includes requesting resolution of a domain name (e.g., name resolution), receiving a list of IP addresses for host servers associated with the domain name, selecting the first IP address in the list, recognizing a connection problem to the host server associated with the first IP address, selecting the second IP address in the list and establishing a connection to the host server at the second IP address. Such a method can occur without repeating a request for resolution of the domain name. While various examples refer to a "first" IP address and a "second" IP address, in a situation where the second fails, a third may be selected. More generally, such an exemplary method selects the next IP address in a list where the particular position of that IP address typically depends on the position of the failed IP address (e.g., $1^{st}$ failed, select $2^{nd}$; $2^{nd}$ failed, select $3^{rd}$; etc.). Hence, an exemplary method may repeat a selecting step as many times as needed.

As mentioned, an application may request resolution using an API call where the application seeks to establish a connection to a host server associated with the domain name. As described herein, failover may occur in response to a failure of an established connection or a failure that prevents establishment of a connection.

Figure 2:
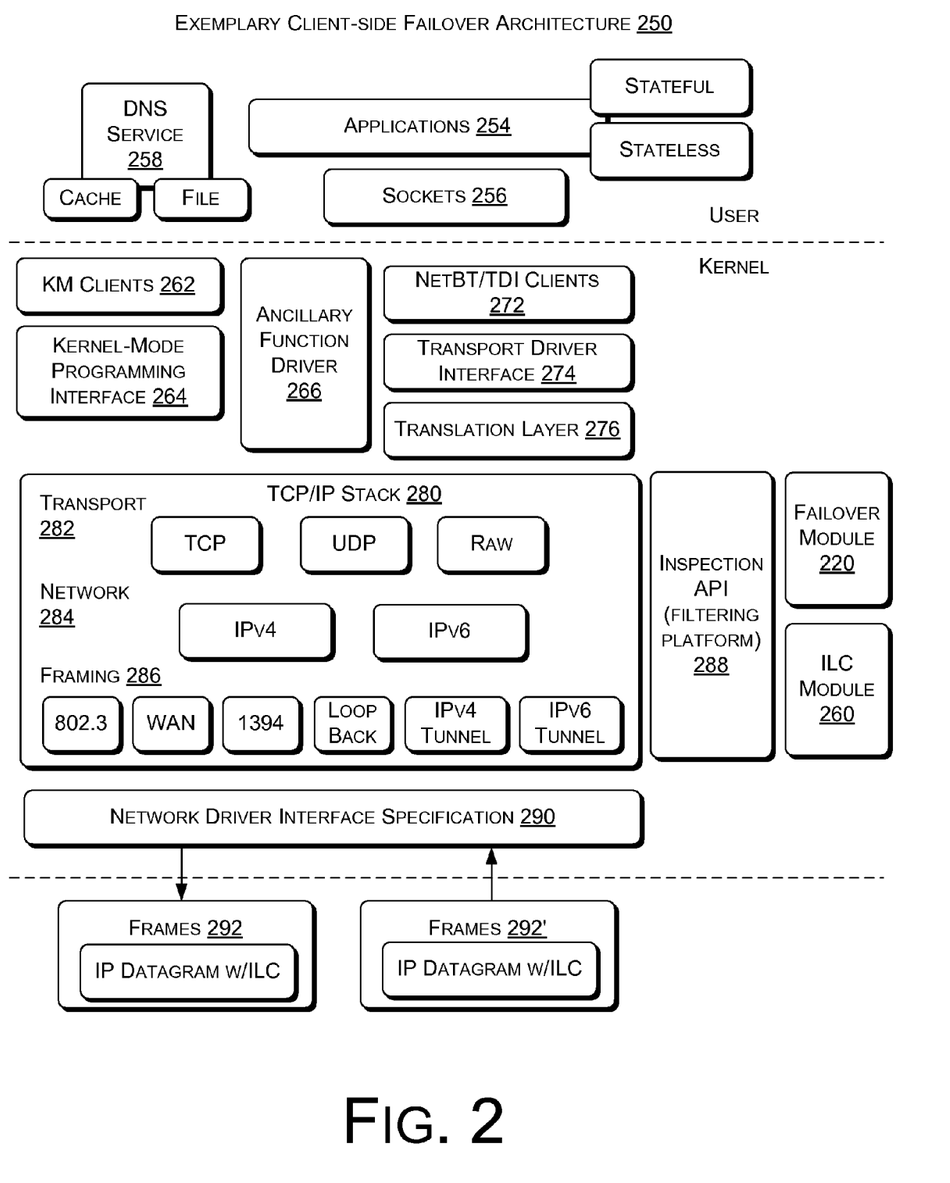
FIG. 2 is a diagram of an exemplary client-side failover architecture.

FIG. 2 shows an exemplary failover architecture 250. The architecture 250 includes components in a user space and components in a kernel space. The user space includes applications 254, which may be stateless or stateful, sockets 256, which is an application programming interface (API) shown as residing in the user space, and a DNS service 258 with an associated cache and file for storing information associated with domain names and IP addresses. The DNS service 258 may be an OS service.

The kernel space includes various components that operate in conjunction with a TCP/IP stack 280, which, in turn, operates via a network driver interface specification (NDIS) 290 to communicate with network resources via frames 292, 292'. The TCP/IP stack 280 includes a transport layer 282, a network layer 284 and a framing layer 286. As shown, frames 292 are outgoing and frames 292' are incoming; both carry an IP datagram that may carry Internet Location Coordinate (ILC) information (see, e.g., FIGS. 3 and 4).

The architecture 250 includes the following APIs by which applications, services, or other system components access the TCP/IP stack 280:

A Kernel-Mode API 264 used by KM clients 262.

Sockets API 256 used by Sockets-based applications and services. The Sockets API 256 operates through an Ancillary Function Driver (AFD) 266 to perform Socket functions with the TCP/IP stack 280.

Transport Driver Interface (TDI) 276 used by NetBIOS over TCP/IP (NetBT) clients and other legacy TDI clients 272. A translation layer 276 exists between TDI 274 and the TCP/IP stack 280.

The TCP/IP stack 280 exposes an inspection API 288, which provides a consistent, general-purpose interface to perform deep inspection or data modification of packet contents. The Inspection API 280 is part of a filtering platform. The TCP/IP stack 280 provides access to the packet processing path at the Network and Transport layers.

The architecture 250 includes the exemplary failover module 220, which may be configured in any of a variety of manners. For example, the failover module 220 may be configured to directly access information in the TCP/IP stack 280. The module 220 may be configured to use the inspection API 288. The failover module 220 may also be configured to expose an API for applications 254.

As already mentioned, the failover module 220 may be part of, or function cooperatively with, the DNS service 258. For example, the failover module 220 may be a separate OS service that can retrieve information from a resolver cache or resolver file.

The architecture 250 also includes an ILC module 260, which provides for processing Internet Location Coordinate (ILC) information. Such information is described in more detail with respect to FIGS. 3 and 4. The ILC module 260 may be configured to operate in conjunction with the failover module 220. For example, failover may occur based at least in part on ILC information. The ILC module 260 may be part of, or function cooperatively with, the DNS service 258. For example, the ILC module 260 may store ILC information in a cache and/or a file associated with the DNS service 258.

Figure 3:
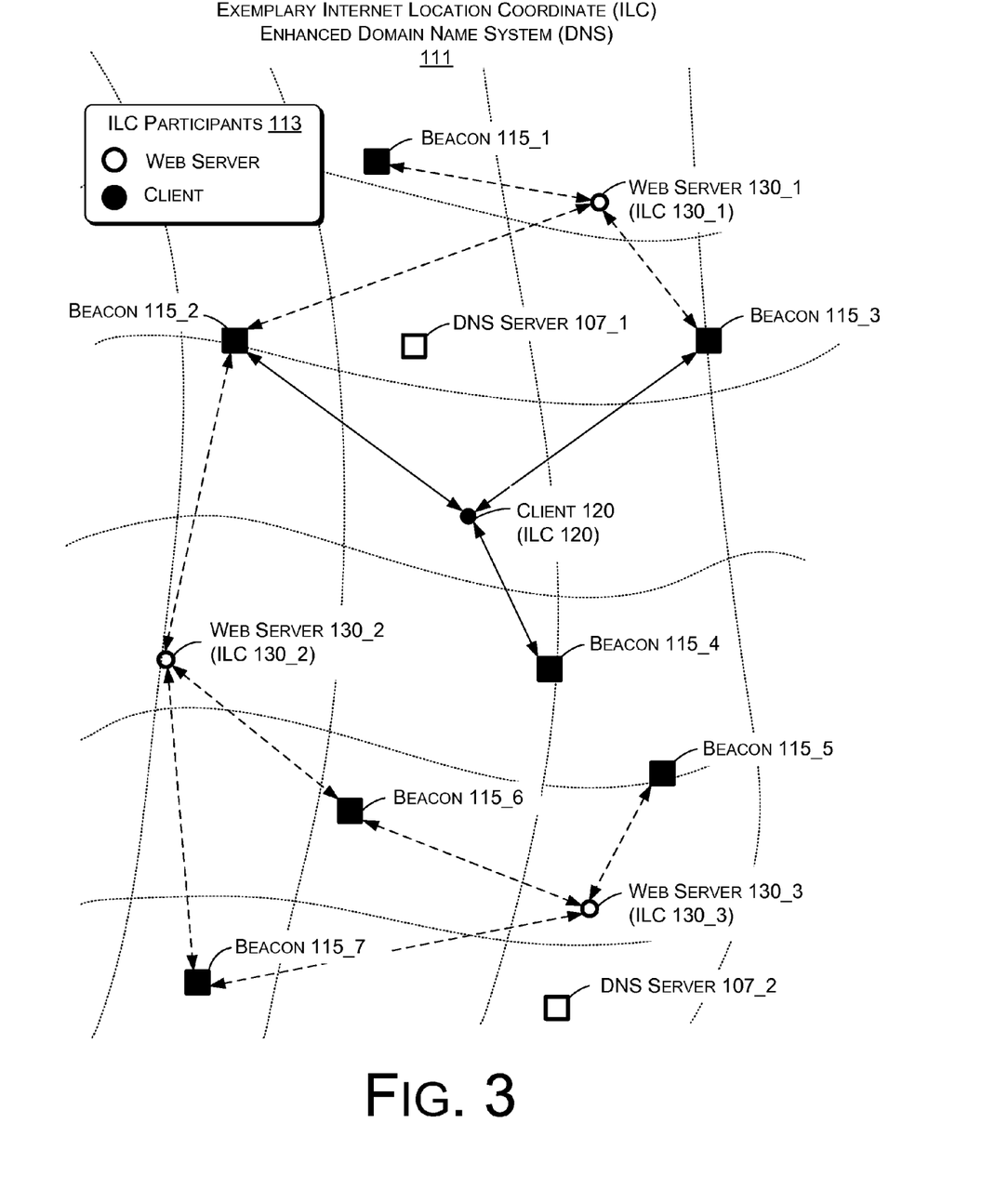
FIG. 3 is a diagram of an exemplary Internet Location Coordinate (ILC) enhanced Domain Name System (DNS)

FIG. 3 shows an exemplary Internet Location Coordinate (ILC) enhanced Domain Name System (DNS) 111. The system 111 includes DNS servers 107, beacons 115, a client 120, and web servers 130. Any resource on the Internet that can acquire an ILC may be deemed an ILC participant. For example, a box in FIG. 3 shows ILC participants 113 as including the client 120 and the web servers 130; thus, in this example, an ILC participant can be a client or a server.

The system 111 may depend on time, distance, network traffic, machine workload, bandwidth, etc. To understand better how such a system may be defined, consider a vehicle on a major interstate highway en route to an airport. At various locations along the highway, the state department of transportation transmits information to displays that provide information to vehicle operators. When the vehicle is at a display location, the department of transportation may transmit a travel time message that indicates how many minutes it will take for a vehicle at the display location to reach the airport. Such information is helpful as the vehicle operator may decide to take an alternate route. Further, the reasons for the stated travel time may be irrelevant to the vehicle operator. In other words, the vehicle operator may not care whether the travel time is lengthy due to road construction, holiday traffic, an accident, etc. While the department of transportation may choose to display a specific reason or reasons, such information may not add much value to the information conveyed by a simple travel time in minutes.

As described herein, in various examples, an Internet Location Coordinate (ILC) may be a number, a set of numbers, or a set of numbers where each one is associated with some additional information (e.g., a tuple for each beacon). An ILC may indicate a local position to a client where this position is with respect to a network logical space measuring "travel time" or congestion, and not necessarily geographic location. ILCs may be compared to estimate "travel time" or congestion between participants. Such simplicity is in-line with the DNS and such an ILC may be carried according to an existing DNS protocol.

Referring again to the system 111 of FIG. 3, the client 120 acquires information associated with three beacons 115_2, 115_3 and 115_4. For example, a beacon can act as a reflector where the client 120 can send a packet to the beacon and receive a response packet. The client 120 can then determine the round trip time (RTT) to and from a beacon (e.g., a "travel time"). As the client 120 performs the same process with multiple beacons (i.e., the beacons 115_2, 115_3 and 115_4), the client 120 becomes more aware of its surroundings. In particular, the client 120 becomes aware of its own condition in the system where its own condition may be represented according to a number or a set of numbers, etc. In the example of FIG. 3, the "condition" is shown as Internet Location Coordinate (ILC). While the example of FIG. 3 shows three beacons, other numbers of beacons may be used. Generally, two or more beacons may be used.

As mentioned, an ILC participant can be any resource on a network. Hence, the web servers 130_1, 130_2 and 130_3 may be participants that can determine respective ILCs using the beacons 115. For example, the web server 130_1 may transmit packets to the beacons 115_1, 115_2 and 115_3 and receive corresponding return packets. As the web server 130_1 may know, a priori, information about the beacons 115_1, 115_2 and 115_3, it can now determine its position in the system (e.g., its ILC).

As described herein, the exemplary system 111 allows clients to determine their position in a network logical space. Such information can be used for a variety of purposes. For example, where the web servers 130_1, 130_2 and 130_3 provide essentially identical services, such information can be used to allow the client 120 to connect to the "best" web server (e.g., the "closest" server based on ILCs).

As described herein, in various examples, an Internet Location Coordinate (ILC) may be a number or a set of numbers (e.g., a tuple for each beacon). An ILC may indicate local "travel time" to a client or local congestion around a client.

Such simplicity is in-line with the DNS and such an ILC may be carried according to an existing DNS protocol.

Referring again to the system 111 of FIG. 3, the client 120 acquires information associated with three beacons 115_2, 115_3 and 115_4. For example, a beacon can act as a reflector where the client 120 can send a packet to the beacon and receive a response packet. The client 120 can then determine the round trip time (RTT) to and from a beacon (e.g., a "travel time"). As the client 120 performs the same process with multiple beacons (i.e., the beacons 115_2, 115_3 and 115_4), the client 120 becomes more aware of its surroundings. In particular, the client 120 becomes aware of its own condition in the system where its own condition may be represented according to a number or a set of numbers, etc. In the example of FIG. 3, the "condition" is shown as Internet Location Coordinate (ILC).

As mentioned, an ILC participant can be any resource on a network. Hence, the web servers 130_1, 130_2 and 130_3 may be participants that can determine respective ILCs using the beacons 115. For example, the web server 130_1 may transmit packets to the beacons 115_1, 115_2 and 115_3 and receive corresponding return packets. As the web server 130_1 may know, a priori, information about the beacons 115_1, 115_2 and 115_3, it can now determine its condition in the system (e.g., its ILC).

As described herein, the exemplary system 111 allows clients to determine their condition in a network space. Such information can be used for a variety of purposes. For example, where the web servers 130_1, 130_2 and 130_3 provide essentially identical services, such information can be used to allow the client 120 to connect to the "best" web server (e.g., the "closest" server based on ILCs).

Figure 4:
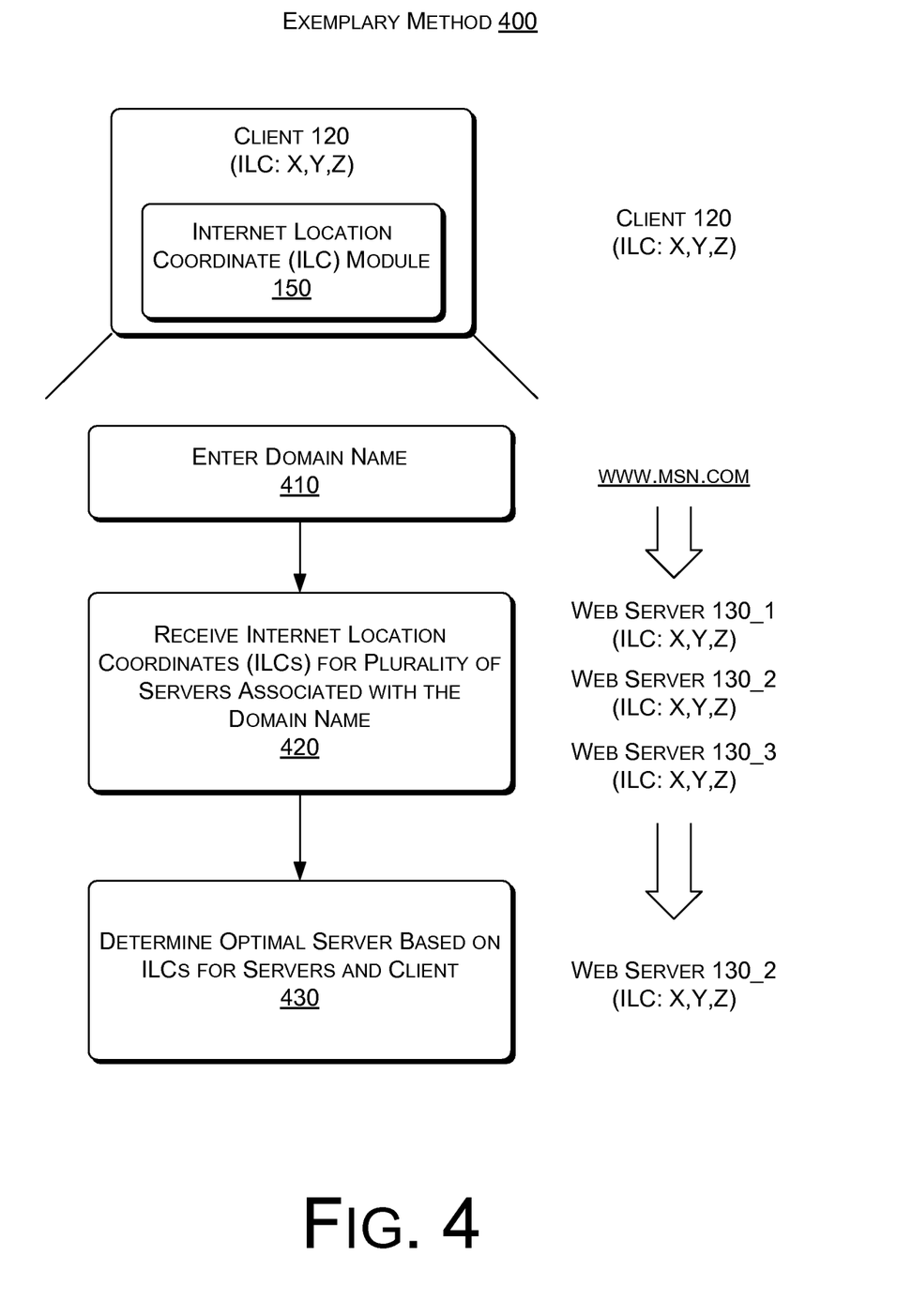
FIG. 4 is a diagram of an exemplary method for determining an optimal server for a group of servers for a domain name.

FIG. 4 shows an exemplary method 400 for determining an optimal server from a plurality of servers. In this example, the plurality of servers are participants in an ILC enhanced system. The method 400 may be implemented using a client 120 located on a network where the client 120 includes an ILC module 150; accordingly, the client 120 "knows" its ILC in the network space.

In an entry block 410, a domain name is entered (e.g., www.msn.com). In turn, a DNS server may identify a plurality of servers associated with the domain name, for example, web server 130_1, 130_2 and 130_3. As explained, each of the servers includes an ILC module to ascertain their respective ILCs. In a receipt block 420, the client 120 receives information about the group of servers along with the ILC for each of the servers in the group. In a determination block 430, the client 120 determines the optimal server based on the ILCs for the servers and its own ILC.

In the example of FIG. 4, the client 120 may be a user connected to the Internet and the domain name may be www.msn.com. This domain name has a plurality of associated servers at various geographical locations around the world. Given the exemplary system 111 where beacons 115 are scattered throughout the networked world, each of servers for the www.msn.com domain name knows its own ILC. When the DNS server communicates with each server, each server can respond by sending its ILC to the DNS server, which, in turn, transmits this information to the client 120. The ILC module 150 can then determine which server is the optimal server based on the client's 120 ILC and those of the servers. In general, the optimal server is the server that can provide the most efficient service to the client 120.

Figure 5:
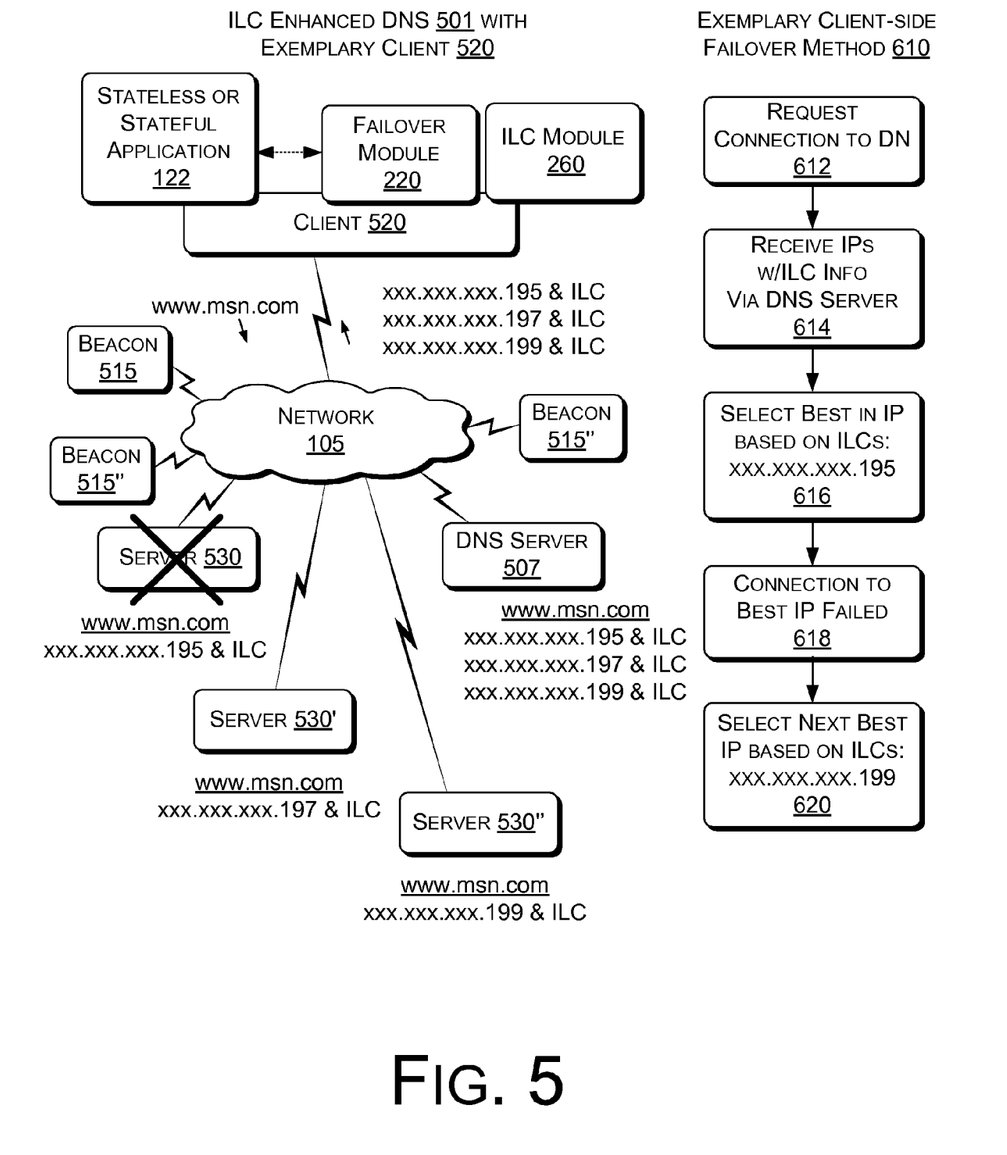
FIG. 5 is a diagram of an exemplary client and an exemplary client-side failover mechanism in an ILC enhanced DNS.

FIG. 5 shows an ILC enhanced Domain Name System (DNS) 501 with an exemplary client 520 and an exemplary client-side failover method 610. The ILC enhanced DNS 501 includes a network 105 (e.g., the Internet), a DNS server 507 and a plurality of beacons 515, 515', 515". The DNS server 507 is configured to communicate IP addresses with ILC information derived from communication with beacons. The client 520 includes a stateless or stateful application 122, a failover module 220 and an ILC module 260. In the example of FIG. 5, a domain name www.msn.com is geo-hosted by a plurality of servers at different geographical locations. Specifically, the domain name www.msn.com is shown as being hosted in three geographical locations by an ILC enhanced server 530 having an IP address xxx.xxx.xxx.195 and an ILC, an ILC enhanced server 530' having an IP address xxx.xxx.xxx.197 and an ILC, and an ILC enhanced server 530" having an IP address xxx.xxx.xxx.199 and an ILC. In this example, the IP addresses may be virtual IP addresses associated with a plurality of real IP addresses.

According to the method 610, in a request block 612, the client application 122 requests a connection to a domain name (DN) (e.g., www.msn.com). The client 520, at the operating system level, includes a mechanism to resolve the domain name and to select an optimal IP address associated with the domain name. In some instances, IP address and ILC information may be cached at the client 520 such that an optimal IP address can be readily obtained. However, where an optimal IP address and ILC for the domain name is not cached, then the name resolution mechanism routes the request to another machine, such as the DNS server 507, which can associate the requested domain name with one or more IP addresses and respective ILC(s).

In a reception block 614, the client 520 receives IP addresses and ILCs associated with the requested domain name. The client 520 uses the ILC module 260 to select the optimal IP address based at least in part on the ILC information. In the example of FIG. 5, the address xxx.xxx.xxx.195 is the optimal IP address based on an analysis of ILCs, which may consider the ILC of the client 520.

Upon selection of the optimal IP address, the client 520 attempts to establish a connection with the server 530. However, per a failure block 618, the connection fails. For example, the server 530 may be overloaded (resulting in a timeout), down, or on a pathway that is faulty. In such a situation, the failover module 220 selects the next best IP address based at least in part on an analysis of ILC information. As shown in FIG. 5, the next best IP address is xxx.xxx.xxx.199, which is associated with the ILC enhanced server 530". In this example, the client 520 relies on the failover module 220 and the ILC module 260.

As described herein, an exemplary method for failover includes requesting resolution of a domain name, receiving a list of IP addresses and Internet Location Coordinates for host servers associated with the domain name, selecting a best IP address from the list based at least in part on the Internet Location Coordinates, recognizing a connection problem to the host server associated with the optimal IP address, selecting a next best IP address from the list based at least in part on the Internet Location Coordinates and establishing a connection to the host server at the next best IP address. Such a method may include receiving state information from a stateful application and communicating the state information to the host server at the next best IP address.

Figure 6:
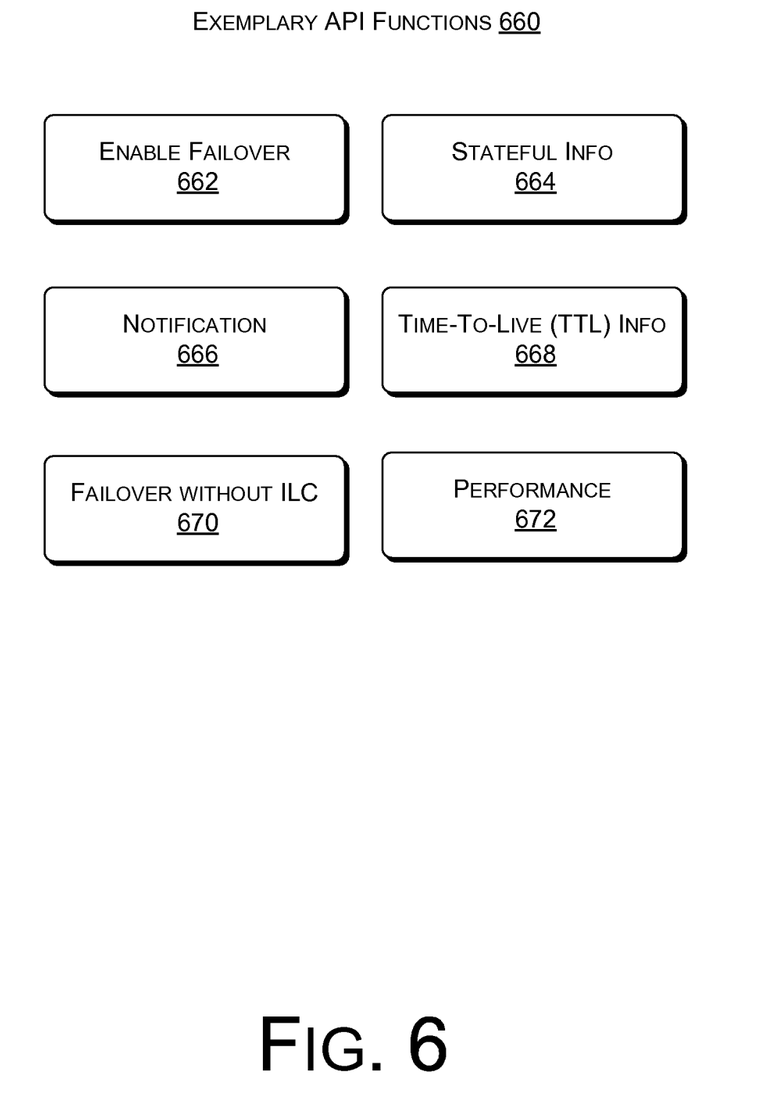
FIG. 6 is a diagram of exemplary API functions for a client-side failover mechanism.

FIG. 6 shows some exemplary functionality 660 of the failover module that are exposed through API functions for use by a client application in a DNS. The APIs 660 include an enable failover functionality 662 that allows a client or client application to enable or disable client-side failover. A stateful information functionality 664 allows a client application to transmit information to a new server during failover (e.g., due to a failure of an established connection or a failure that prevents establishment of a connection). Such functionality can allow a client application to failover in a seamless manner, optionally without notification to a user, which can preserve user experience of the client application. Notification functionality 666 allows a client or client application to cause a notification to be issued or recorded when failover occurs. Such functionality may also communicate information as to the particulars of the failover (e.g., host server in Redmond to host server in Dublin).

Time-to-live (TTL) functionality 668 allows a client or client application to examine, acquire or alter TTL information associated with one or more domain names/IP addresses, for example, as stored in a cache and/or a file.

Additional functionality 670 allows for failover without ILC consideration, which may be used by client applications that do not necessarily need the "best" host server. Yet further functionality 672 allows a client or client application to present performance information, which can reflect changes due to failover. Exemplary performance functionality allows a client application to select conditions for failover. For example, if a client application requires a certain speed of transmission, then a threshold may be set using the performance function to cause failover if the speed falls below the threshold.

Figure 7:
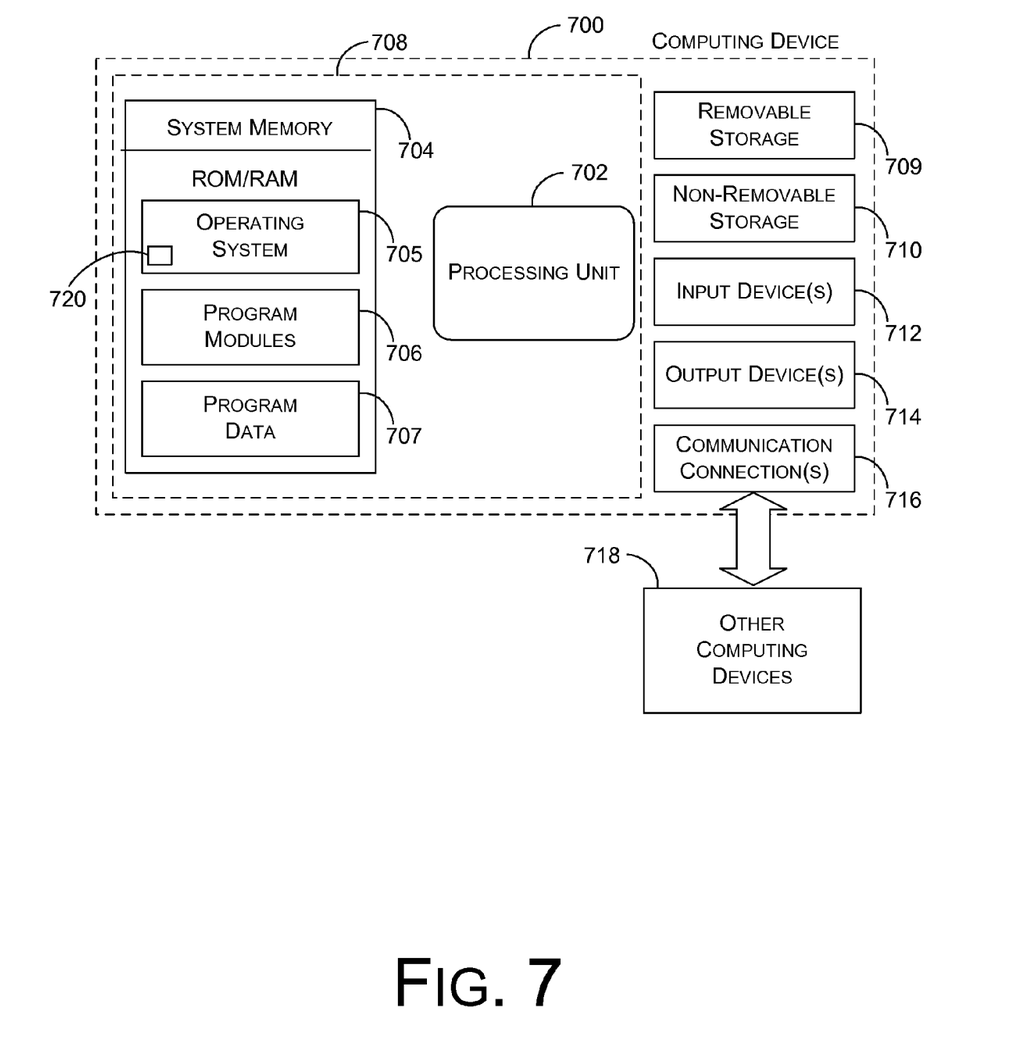
FIG. 7 is a block diagram of an exemplary computing device.

FIG. 7 illustrates an exemplary computing device 700 that may be used to implement various exemplary components and in forming an exemplary system. For example, the clients 120 or the servers 130 of the system of FIG. 1 may include various features of the device 700.

In a very basic configuration, computing device 700 typically includes at least one processing unit 702 and system memory 704. Depending on the exact configuration and type of computing device, system memory 704 may be volatile (such as RAM), non-volatile (such as ROM, flash memory, etc.) or some combination of the two. System memory 704 typically includes an operating system 705, one or more program modules 706, and may include program data 707. The operating system 705 include a component-based framework 720 that supports components (including properties and events), objects, inheritance, polymorphism, reflection, and provides an object-oriented component-based application programming interface (API), such as that of the .NET™ Framework marketed by Microsoft Corporation, Redmond, Wash. The device 700 is of a very basic configuration demarcated by a dashed line 708. Again, a terminal may have fewer components but will interact with a computing device that may have such a basic configuration.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by removable storage 709 and non-removable storage 710. Computer storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 700. Computing device 900 may also have input device(s) 712 such as keyboard, mouse, pen, voice input device, touch input device, etc. Output device(s) 714 such as a display, speakers, printer, etc. may also be included. These devices are well known in the art and need not be discussed at length here.

Computing device 700 may also contain communication connections 716 that allow the device to communicate with other computing devices 718, such as over a network. Communication connections 716 are one example of communication media. Communication media may typically be embodied by computer readable instructions, data structures, program modules, or other data forms. By way of example, and not limitation, communication media includes wired media such as a wired network or direct-wired connection, and wireless media such as acoustic, RF, infrared and other wireless media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
   memory;
   at least one processing unit of a client computing device, wherein the at least one processing unit is communicatively coupled to the memory;
   instructions stored in the memory and executable by the at least one processing unit, the instructions to:
      request resolution of a domain name using a Domain Name System (DNS) protocol;
      receive, in response to the request, a list of Internet protocol (IP) addresses and Internet Location Coordinates (ILCs) for host servers associated with the domain name, the ILCs for the host servers being determined based at least in part on communication with network beacons by the host servers;
      respond to a connection problem to a host server at an IP address by selecting a different IP address from the list, the selecting the different IP address comprising comparing an ILC of the client computing device, as determined based at least in part by the client computing device sending packets to network beacons, with an ILC of a different host server at the different IP address, as determined based at least in part by the different host server sending packets to network beacons; and
      initiate a connection to the different host server at the selected, different IP address, the client computing device being configured to connect to at least one of a plurality of host servers.

2. The system of claim 1 wherein the instructions further comprise an application programming interface (API).

3. The system of claim 2 wherein the API comprises notification functionality to notify an application executing on the client computing device of a failover.

4. The system of claim 1 wherein the connection problem to the host server at the IP address occurs in the context of a first application and the selected different IP address is returned in the context of a second application.

5. The system of claim 1 wherein the connection problem comprises a connection failure.

6. The system of claim 1 wherein the connection problem comprises an unacceptable connection response time.

7. The system of claim 1 wherein the list comprises Internet Location Coordinates for at least some of the IP addresses.

8. The system of claim 1 wherein the host server comprises state information about an application executing on the client computing device.

9. The system of claim 8 further comprising instructions to communicate state information to at least one of the host servers associated with the domain name.

10. A method for failover, implemented by a computing device, the method comprising:
   requesting, by the computing device, resolution of a domain name using a Domain Name System (DNS) protocol;
   receiving, in response to the requesting, a list of Internet protocol (IP) addresses and Internet Location Coordinates (ILCs) for host servers associated with the domain name, the ILCs for the host servers being determined based in part on communication with network beacons by the host servers;
   selecting, by the computing device, a first IP address from the list;
   recognizing a connection problem to a host server associated with the first IP address;
   selecting, by a failover module operating at an operating system level of the computing device, a second IP address from the list, wherein the selecting the second IP address comprises comparing an ILC determined by the computing device based in part on sending packets to network beacons with one of the ILCs determined by a different host server at the second IP address; and
   returning, by the failover module operating at the operating system level of the computing device, the second IP address to further DNS queries for the given domain name.

11. The method of claim 10 wherein the connection problem to the host server associated with the first IP address occurs in the context of a first application and the selected second IP address is returned in the context of a second application, the failover module further operating in a seamless manner to failover the first application to the second IP address in response to the connection problem, wherein the experience of a user of the first application is uninterrupted by the connection problem.

12. The method of claim 10 wherein the connection problem comprises a connection failure.

13. The method of claim 10 wherein the connection problem comprises an unacceptable connection response time.

14. The method of claim 10 wherein the requesting comprises an API call by an application seeking to establish a connection to a host server associated with the domain name.

15. The method of claim 14 wherein the application comprises a stateless application.

16. The method of claim 14 further comprising receiving state information from a stateful application.

17. The method of claim 16 further comprising communicating, by the computing device, the state information to the different host server at the second IP address, wherein when the host server at the second IP address requires login information from the computing device to further the DNS queries, the failover module provides the login information without interruption of a user of the computing device.

18. A method for failover, implemented by a client computing device, the method comprising:
   acquiring an Internet Location Coordinate (ILC) based at least in part on communication, by the client computing device, with network beacons;
   requesting, by the client computing device, resolution of a domain name using a Domain Name System (DNS) protocol;
   receiving, in response to the requesting by the client computing device, a list of Internet protocol (IP) addresses and Internet Location Coordinates (ILCs) for host servers associated with the domain name, the ILCs for the host servers being derived based in part on communication with network beacons by the host servers;
   comparing, by the client computing device, the ILC of the client computing device with the ILCs for the host servers;
   selecting, by the client computing device, an IP address from the list based at least in part on the comparing;
   recognizing, by the client computing device, a connection problem to the host server associated with the IP address;
   selecting, by the client computing device, a next IP address from the list based at least in part on the comparing; and
   establishing, by the client computing device, a connection to the host server at the next IP address.

19. The method of claim 18 further comprising receiving state information from a stateful application and communicating the state information to the host server at the next IP address.

* * * * *